United States Patent [19]
Lynnworth

[11] Patent Number: 5,275,060
[45] Date of Patent: Jan. 4, 1994

[54] ULTRASONIC TRANSDUCER SYSTEM WITH CROSSTALK ISOLATION

[75] Inventor: Lawrence C. Lynnworth, Waltham, Mass.

[73] Assignee: Panametrics, Inc., Waltham, Mass.

[21] Appl. No.: 670,702

[22] Filed: Mar. 18, 1991

Related U.S. Application Data

[63] Continuation-in-part of Ser. No. 546,586, Jun. 29, 1990, Pat. No. 5,179,862.

[51] Int. Cl.⁵ .............................................. G01F 1/20
[52] U.S. Cl. ................................ 73/861.18; 73/861.25
[58] Field of Search ............ 73/632, 642, 644, 861.18, 73/861.25, 861.26, 861.27, 866.5, DIG.

[56] References Cited

U.S. PATENT DOCUMENTS

| | | | |
|---|---|---|---|
| 4,098,117 | 7/1978 | Baumoel | 73/861.27 |
| 4,417,480 | 11/1983 | Zacharias, Jr. | 73/861.27 |
| 4,532,812 | 8/1985 | Birchak | 73/861.27 |
| 4,742,717 | 5/1988 | Ichino | 73/866.5 |
| 4,783,997 | 11/1988 | Lynnworth | 73/644 |

*Primary Examiner*—Louis Arana
*Attorney, Agent, or Firm*—Lahive & Cockfield

[57] ABSTRACT

Transducers are mounted in a housing or vessel to propagate signals along a fluid measurement path, and a plurality of massive elements are placed between transmitting and receiving transducers in the acoustic propagation path through the solid body of the housing or vessel to remove crosstalk. In a preferred embodiment, the elements are rings, which are attached to, or are machined from a thicker cylinder to leave a thin-walled cylinder that holds the transducer off from a conduit wall. Preferably the rings are closely spaced or contiguous, but contact each other only along a small point-like region, so that substantially all ringing acoustic energy flows to the rings via the thin-walled stand-off. In one embodiment, a thick-walled tube is formed with plural radially oriented slots to yield an equivalent structure of alternating masses. In a related embodiment, inner and outer thick-walled tubes so formed are joined at one end to provide a longer path. For measuring stack gases, the isolated transducer stand-off fits within a sleeve that channels purge gas to prevent excessive heating and prevent fouling. Different mounting systems provide high signal strength with varying amounts of crosstalk as the pressure varies.

15 Claims, 8 Drawing Sheets

ULTRASONIC TRANSDUCER SYSTEM WITH CROSSTALK ISOLATION

This application is a continuation-in-part of Ser. No. 07/546,586 filed Jun. 29, 1990 now U.S. Pat. No. 5,179,862.

BACKGROUND OF THE INVENTION

The present invention relates to ultrasonic transducer and measurement systems of the type wherein an electrically actuated signal source, typically a piezoelectric crystal, is mounted in a mounting assembly fixed to a housing or wedge, or fixed directly to a conduit, to propagate ultrasonic signals through a medium flowing in the conduit. It particularly relates to such transducer and measurement systems wherein the medium has a low density, such as a gaseous medium, and wherein the size of the conduit or the signal path length through the medium raise considerations of crosstalk.

In these circumstances, the amount of signal energy which can be received through the medium is relatively small. Furthermore, because the signal propagates through the gas with a velocity difference from its propagation velocity through the solid structure of the conduit, it can be difficult to find a suitable timing window in which the received signal can be dependably distinguished from ringing or other energy propagated directly through the conduit walls.

To some extent the problem of signal strength can be addressed by appropriate impedance matching and the use of a large-area diaphragm to couple the crystal to the medium. However, suitable isolation remains a problem.

One approach to this problem has been discussed in the inventor's previously filed U.S. patent application entitled Snap-On Flow Measurement System, filed on Jun. 29, 1990 as Ser. No. 546,586. In that application, specifically with reference to FIG. 15A thereof, a construction is shown involving acoustically massive rings or a spiral body interposed in the solid body acoustic path between the transmitting and receiving crystals. The present disclosure is directed to related constructions and different practical embodiments of such transducer isolation and mounting structures.

BRIEF DESCRIPTION OF THE INVENTION

In accordance with the present invention, a transducer is mounted in a housing or vessel to propagate signals along a gas interrogation path, and a plurality of massive elements are placed between transmitting and receiving transducers in the acoustic propagation path through the solid body of the housing or vessel.

In a preferred embodiment, the elements are rings, which are placed within a thin-walled cylinder that holds the transducer off from a conduit wall. Preferably the rings are closely spaced or contiguous, but contact each other only along a small point-like region, so that substantially all acoustic energy flows to or from each ring via the thin walled stand-off. In one embodiment, a thick-walled tube is formed with plural radially oriented slots to yield an equivalent structure of alternating masses. In a related embodiment, inner and outer thick-walled tubes so formed are joined at one end to provide a longer damping path.

DETAILED DESCRIPTION

Figure 1:
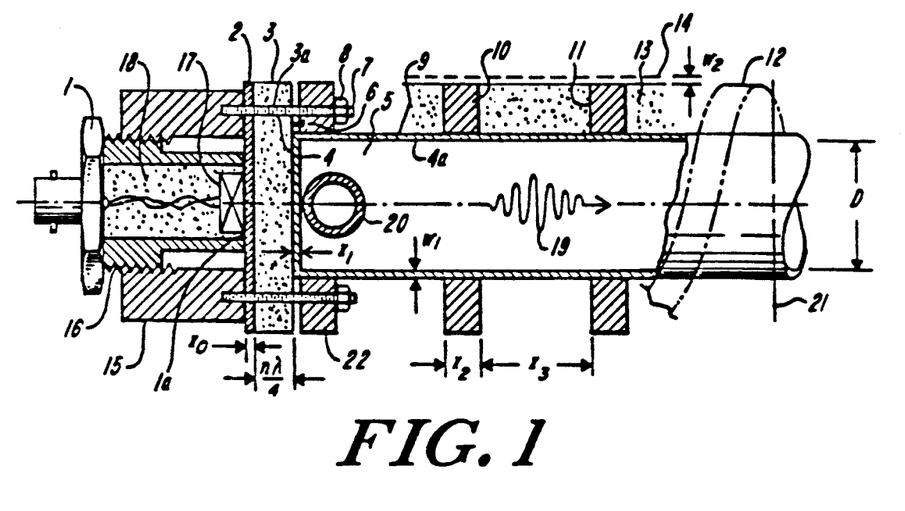
FIG. 1 shows a cross-sectional view of one ultrasonic transducer assembly.

FIG. 1 shows an ultrasonic transducer configuration as described in applicant's aforesaid U.S. patent application Ser. No. 546,586, the text of which is hereby incorporated by reference for a fuller description of the context and operation of the device. This embodiment has a transducer housing 1 which holds an electroacoustic signal generating element 17 to launch and receive ultrasonic signals indicated by 19.

The wave 19 exits from transducer housing 1 through the housing end window 1a, which may be made of plastic, ceramic or metal foil, via a relatively stiff plate 2 of thickness $x_o$. Plate 2 and housing end window 1a are illustrated as flat but may be slightly curved to simplify coupling or for other reasons. Plate 2 may be a stainless steel member of thickness $x_o = 0.25$ mm, for example. It is coupled or bonded to a quarter-wave impedance matcher 3 of thickness $n \lambda/4$, where n is an odd integer an $\lambda$ is the wavelength in the matcher. The wave 19 next passes through a cell end window 4, whose thickness $x_1$ is small compared to wavelength. For example, for a 100 kHz acoustic signal, where the wavelength in stainless steel could be about 50 mm, $x_1 \leq 0.1$ mm would be appropriate.

An end window this thin would deform if the cell were evacuated, unless the external atmospheric pressure were prevented from acting against the window, or unless the window were reinforced and stiffened. In FIG. 1 the window is stiffened by bonding the quarter-wave member to it, and also by sealing, as with an O-ring 6. Adapter 15 and plate 2 and matcher 3 are attached to an acoustically-massive ring 22 that is brazed, epoxied or otherwise bonded around the end region of the thin-wall tubular conduit 4a that comprises the major part of the cell 9. The attachment of this ring is accomplished by means of threaded studs 7 and nuts 8, or other conventional means. A gas entry port 20 is located near the inlet of cell 9, and another one, not shown, is symmetrically located near the other end of the symmetrical cell, symmetry being indicated by centerline 21. Gas 5 enters and exits through these ports, and its properties are measured by detection and correlation of acoustic signals passing therethrough.

The speed of sound in most gases is much slower than in typical engineering metals like stainless steel, and this may lead to an acoustic short circuit problem, as discussed in the applicant's book, Ultrasonic Measurements for Process Control, Academic press 1989, in chapters 3 and 4. But if the thickness $w_1$ of wall $4a$ is sufficiently thin ($fw_1 << 1$ MHz.mm) then acoustic energy propagating as a lowest-order asymmetric ($a_o$)-flexural wave will propagate at a phase velocity $c_f < c\text{-}_{gas}$. In accordance with the present invention, energy propagating in the $a_o$ mode as well as in other modes is attenuated by introduction of a multiplicity of impedance mismatches along the conduit. Structures for this are illustrated in FIG. 1 and include acoustically-massive rings 10 and 11, and an acoustically-massive spiral 12, either of which further serves as a mechanical reinforcement to support the thin conduit wall during evacuation.

Further attenuation of the unwanted wall-borne energy is accomplished in this embodiment by surrounding at least part of the conduit wall $4a$ with dampening material 13. Material 13 may be enclosed by another thin-wall tube 14 of thickness $w_2 << \lambda$. Teflon, soft elastomers, urethanes, or mixtures containing Faber-Castel "Magic Rub" eraser bits have been found to be effective absorbers for waves near 100 kHz or above. Such materials may also be used as a potting medium 18 within transducer assembly 1. The spacing $x_3$ between rings 10 and 11, or between spiral turns, is preferably less than the pipe diameter D. The width $x_2$ of the massive rings is preferably on the order of one quarter wavelength of the wave to be blocked. If waves of several frequencies are to be blocked then the inter-ring spacing or dimension $x_2$ ought to be different for different rings; for the spiral embodiment, the pitch or thickness of successive turns of the spiral may vary.

The matcher 3 may be made of Emerson and Cumming syntactic foam, or for temperatures above the rating of such a foam, of low-density grade of graphite or a graphite composite formed of layers each thin compared to $\lambda/4$ and drilled with numerous small holes that do not align when the several layers comprising the matcher are sandwiched into a bonded stack. The net effect is very Porous low-density low-impedance matcher The individual layers may be electroless nickel plated and then all the layers soldered together. In these examples, the matcher is stiff and capable of supporting pressure differentials. The matcher not only impedance matches but also serves to support the thin window 4. The outside surface of window 4 can also be "wrung" against matcher 3 using a thin layer of oil or other acoustic couplant along interface $3a$. With such a coupling, the window 4 can be maintained flat, yet be removably coupled to the matcher. Plate 2, while thin, can be two to ten times thicker than window 4, since plate 2 is on the high impedance part of the circuit, while window 4 is on the low impedance side.

The housing of transducer assembly 1 may be metallic, e.g., aluminum, stainless steel or titanium, or may be plastic. If plastic, it is preferably shielded electrically on the inside. The housing can also contain a first impedance matching layer (not shown) of impedance $Z_o$ in which case the matcher 3 must have an impedance $Z_3 < Z_o$, as may be inferred from the work of Khuri-Yakub et al (1988) reviewed in applicant's aforementioned book, at page 125.

Figure 2:
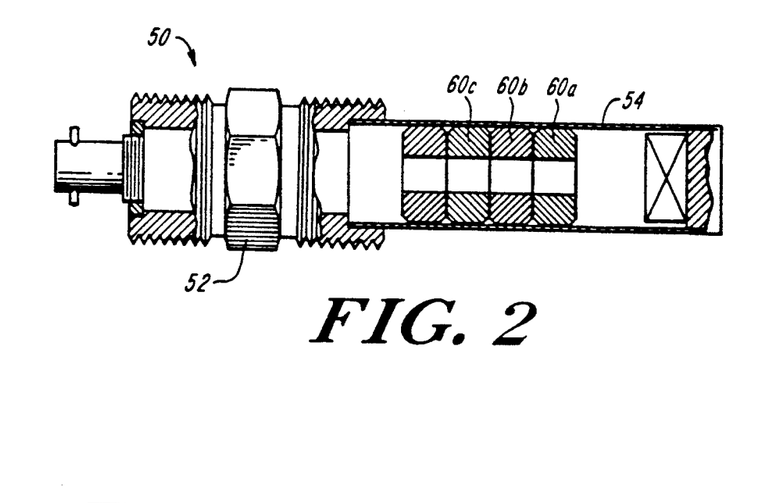
FIG. 2 shows a cross-sectional view of another transducer assembly in accordance with the present invention.

In the embodiment FIG. 1, the impedance-varying isolation rings or spiral are placed along the conduit, which thus contains the signal isolation structure, while the transducer housing is devoted to structural or impedance matching elements for launching the acoustic signal into a gas. FIG. 2 shows a different embodiment, wherein the transducer housing itself contains the isolation structure.

In this embodiment a transducer assembly 50 includes a threaded base 52 that secures a thin-walled cylindrical housing 54 approximately twenty mils thick, having a signal-transducing crystal 56 mounted at its tip followed by suitable coupling, impedance matching and sealing elements as described in connection with FIG. 1. When the base 52 is screwed into a mounting hole, the crystal end projects into the stack or conduit. Located within the thin-walled transducer housing 54 are a plurality of massive rings $60a$, $60b$, $60c$ . . . which are press-fit in position and then welded. Each ring is chamfered to facilitate insertion, and has an aperture through its center for passage of transducer wires. Each ring is approximately 0.25 inches thick and its edges are chamfered 0.06 inches. One or more dimples are made on each axially-directed face of the inserts, e.g., with a prick punch, and the inserts are then pressed together so that they actually contact each other only at the dimples, and remain essentially acoustically isolated from each other except via the thin walled shell. This assures that the acoustic path between the transducer crystal and the transducer's point of attachment to the stack or conduit passes through an alternating series of massive elements. While four rings are shown, the invention contemplates generally three to six such elements, the number varying with the application and being generally selected based upon considerations of the desired transducer size and weight, allowable insertion loss, and the like, as discussed further below.

Figure 3:
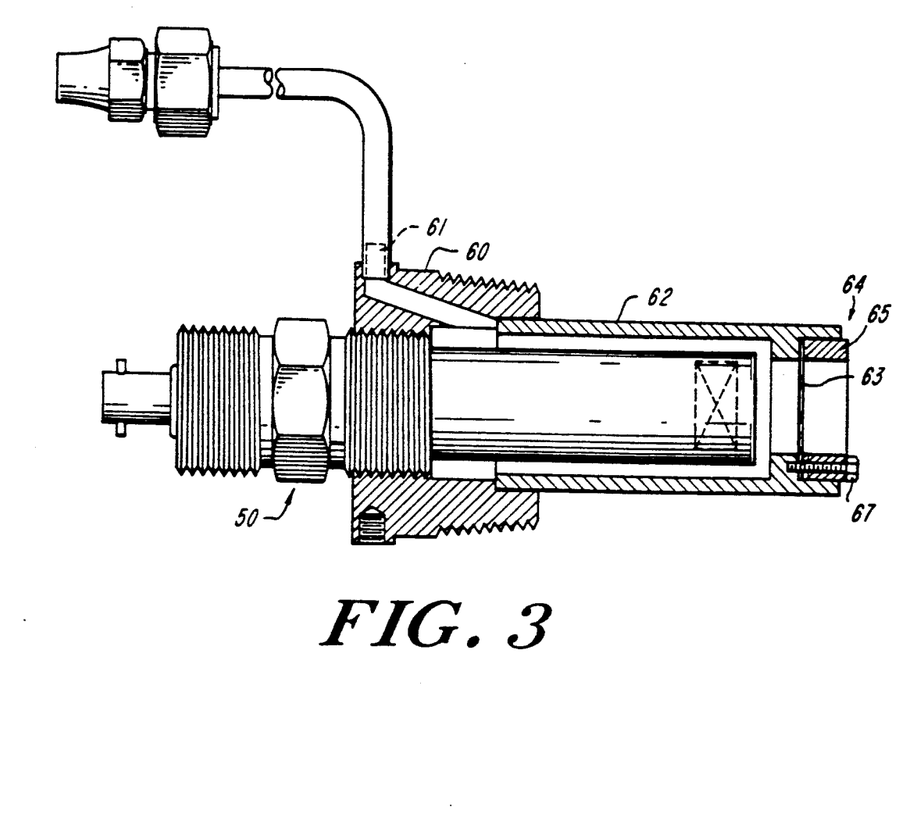
FIG. 3 shows the assembly of FIG. 2 in a high temperature mounting.

FIG. 3 shows the transducer assembly 50 of FIG. 2 mounted for interrogating a flow of stack gas or other high temperature fluid. The previously described sensor structure 50 is mounted within an external mounting assembly comprised of a base 60, and a surrounding sleeve or shell 62 and protective end cap 64, which together define a jacket for a flow of cooling/purge air through passage 61, and via cap 64 into the sensed fluid streams. Cap 64 may include for example, one or more nickel, stainless steel or plated graphite screens 63 secured by a mounting ring 65, which in turn is affixed with cap screws 67.

Figure 4:
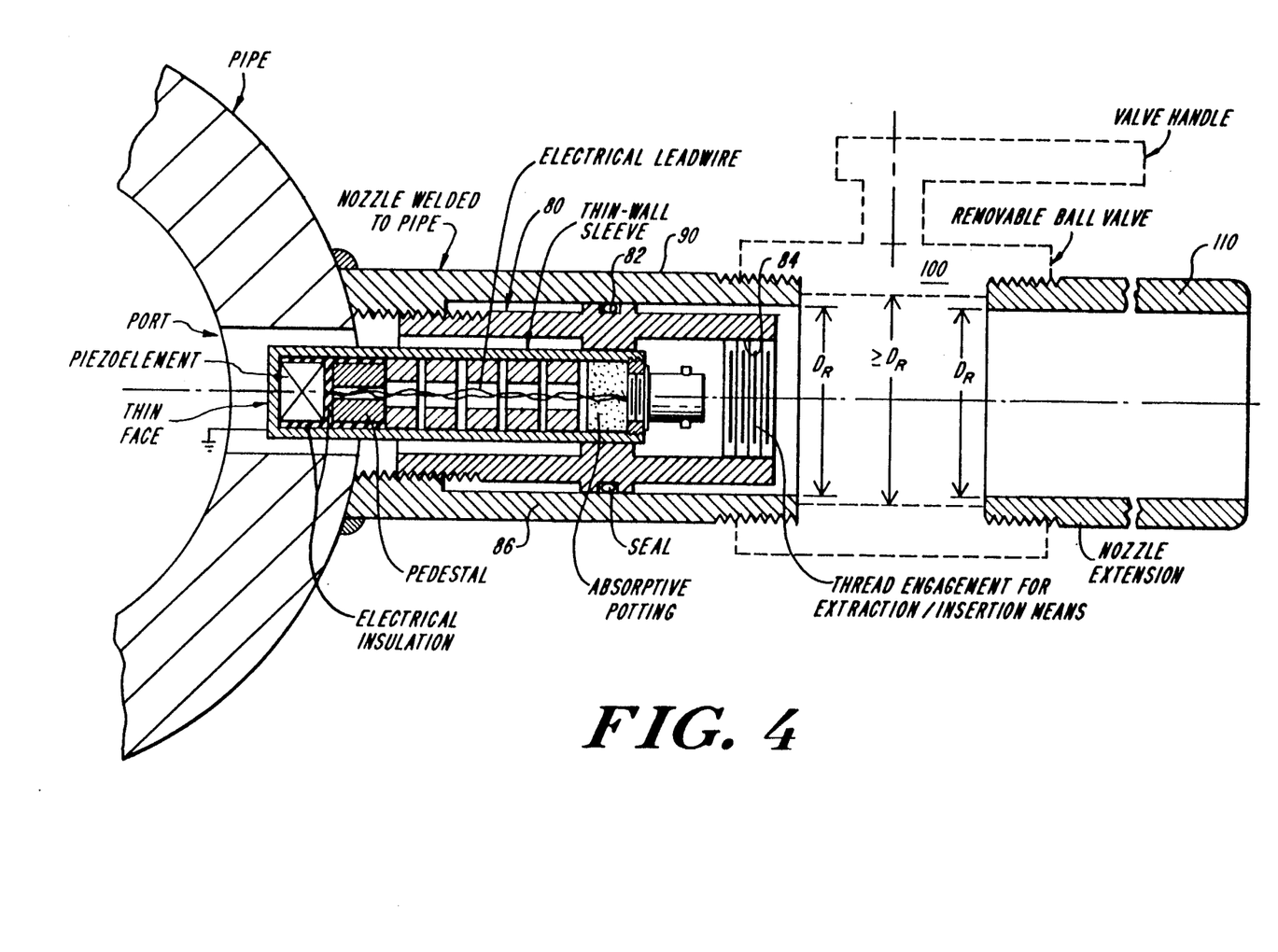
FIG. 4 shows an embodiment of the invention adapted to be removably placed in a valved pipe nozzle.

In some installations it is important to be able to remove the tranducer assembly without depressurizing the pipe, and without incurring the cost of leaving an "isolation valve" permanently installed at each nozzle. One way of satisfying this requirement is indicated in FIG. 4. Here a nozzle extension 110 is removably attached by means of a removable ball valve 100 (shown in dashed lines to emphasize its non-permanent status) to a nozzle 90 that is welded to the pipe. The nozzle and nozzle extension are coaxially bored through to a diameter $D_R$ and the ball valve has a passageway when open of at least $D_R$. A gland 80 is attached to or is part of the transducer assembly. The gland contains sealing means, illustrated as a O-ring 82 or other packing means, and is installed or removed by connecting an insertion or removal tool to the threads 84 shown at one end, or by other similar mechanical attachment. In the embodiment illustrated, the transducer assembly is installed in a slightly recessed position. Potting material 86 absorbs the ringdown within the transducer's isolation structure. The acoustic masses are coupled to the thin-wall sleeve by circumferential welds, which Applicant has found to constitute a practical joint, fabricable by electron beam welding. Alternatives include brazing or provision of epoxy between the acoustic masses and the surrounding thin-wall sleeve.

Figure 5:
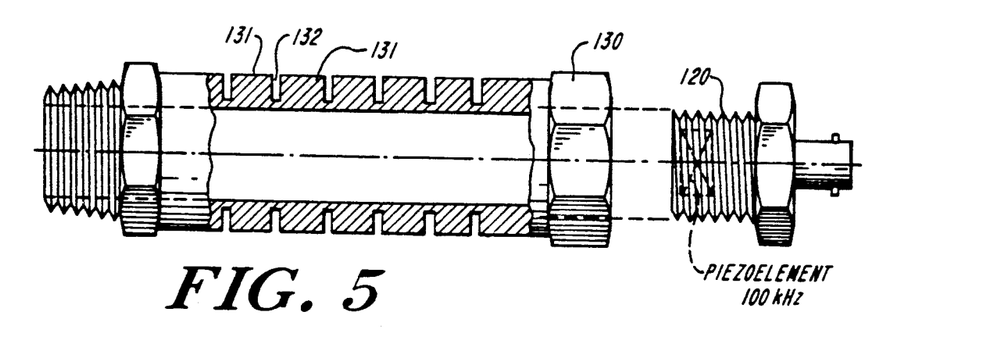
FIGS. 5 and 6 show isolator bodies interposed between a tranducer and a conduit.

In the designs of FIGS. 2-4 discussed so far, the isolation structure consisting of alternating hi Z, lo Z impedance has been permanently built onto the transducer assembly. To facilitate repair of the transducer, and to reduce inventory costs and possibly fabrication costs in some instances, it may be desirable to separate the piezoelectric element from the hi Z, lo Z structure. One way to accomplish such separation of elements is shown in FIG. 5.

Here the transducer housing 120 contains the piezoelectric crystal, mounted against a membrane front face such as a steel membrane of thickness 50 μm to 250 μm, which Applicant has found appropriate for frequencies on the order of 100 kHz. As before, a quarter-wave impedance matcher may be installed between the piezo element and the thin window. The transducer housing 120 screws into an isolator section 130, and the isolator 130, in turn, screws into the nozzle on the pipe or stack. The isolator specifically includes a multiplicity of impedance mismatches created by alternating acoustic masses 131 and gaps 132. The gaps 132 may be on the outside or inside of the isolator, the former choice being illustrated on FIG. 5. The number of interruptions in the conduit wall that are required to achieve an effective level of attenuation depends on the application, i.e., on the gas impedance and pipe material and geometry. In a very large steel pipe, say one meter in diameter filled with ordinary air, the transit time across the air diameter path at 20 deg C. is about 3 ms. In this amount of time the short circuit or crosstalk decays quite a bit at 100 kHz, and so only a few sections of hi Z, lo Z conduit mismatch are required. But for a small steel pipe, of about 50 mm diameter, the transit time for air at room temperatures is only about 0.05 m/343 m/s=150 μs. In this case, about six sections are required, three on each side of the path. These illustrative numerical examples apply for transducers radiating through very thin diaphragms, a construction in which the diaphragms also contribute to the isolation. If thicker windows are used, more isolation is required in the hi Z, lo Z structure.

Figure 6:
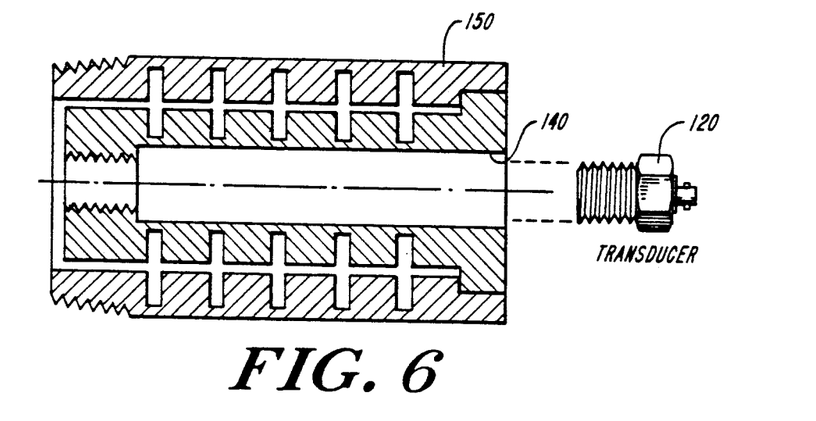

In cases where many sections of hi Z, lo Z appear necessary but where space is restricted in the nozzle's axial direction, a reentrant isolator structure may be employed, as illustrated in FIG. 6. In this embodiment the tranducer 120 is mounted at the end of one leg 140 of the isolator structure, and the far end of the other leg 150 attaches to the conduit. Each leg has a structure of alternating impedance mismatches resulting from radially-oriented circumferential slots. As shown, the irregular slotted surfaces of the two legs are essentially enclosed by the legs themselves, rendering the structure largely resistant to clogging accumulations.

Unlike structures of packing washers or the like which have been used to isolate transducers, this structure can be used in a steam environment without waterlogging, deteriorating or changing its properties, and is composed entirely of perfectly elastic, rather than visco-elastic elements.

Viewed as a function of distance along the housing or conduit from the transducer crystal, the acoustic impedance of the isolation structures described herein will be seen to have the profile of a square wave, with a peak-to-valley ratio corresponding to the thickness of the original stock and the depth of the isolating slots 132 (FIG. 5). Preferably this impedance alternation ratio is over 3:1, and more preferably, greater then 6:1.

Figure 7:
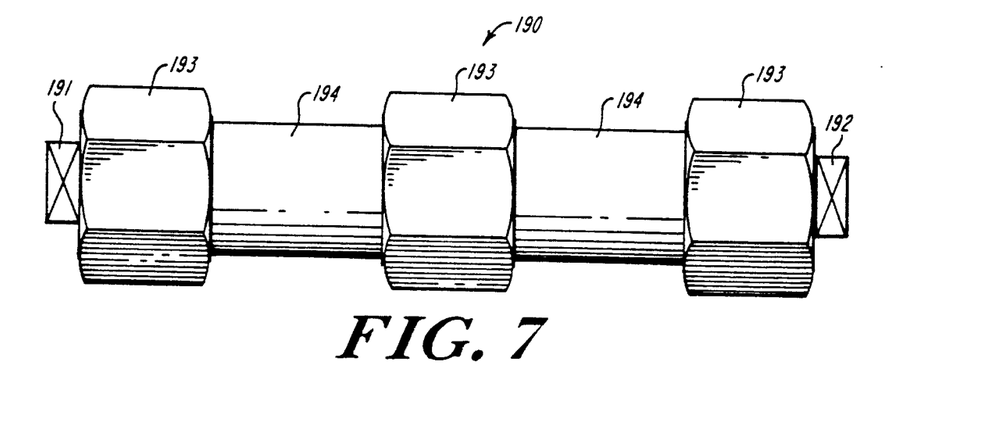
FIGS. 7 and 7A show an isolator body incorporated in a sensing conduit, and show signal characteristics thereof, respectively.
Figure 7A:
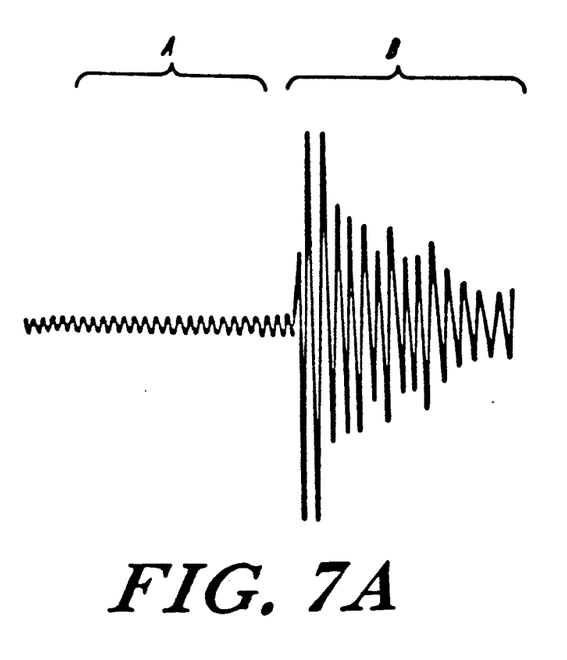

This aspect of the invention may also be implemented using conventional conduits and fittings in a variety of ways. For example, a structure wherein the alternating masses are placed about the conduit between two transducers, rather than between a transducer crystal and the conduit, may be constructed as shown in FIG. 7. In this system 190, a pair of opposed transducers 191, 192 launch and receive signals through a fluid path constrained by a conduit formed of alternating segments of 1½ inch pipe couplings 193 and six inch lengths of pipe 194, the couplings having a much greater wall thickness and acoustic impedance than the pipe lengths. FIG. 7A shows an oscillogram of a received signal propagated through air in the isolator conduit embodiment of FIG. 7, indicating the very low level of crosstalk (region A) and the well defined transmitted signal (region B).

To quantify the nature of impedance mismatch created by the alternating masses and their effect on particular signals, one must deal with the wave impedance, and that means knowing exactly what the wave of interest is, which is to be isolated or blocked by successive mismatches. For many of the frequencies and dimensions of concern here, not just one wave but several are involved, including different modes, e.g., flexural, symmetric and asymmetric. Although we may not know the exact formula for impedance for each wave mode of interest, one can make the assumption that the magnitude of the wave impedance is proportional to the mass per unit area in a plane perpendicular to the axis of the isolator section. This means that one can represent the impedance function like a square wave drawn on a graph of mass per unit area (y-axis) vs axial dimension (x-axis). In the "square wave" the peaks and valleys do not need to have equal durations; applicant has found that very small gaps between masses suffice.

Unlike typical impedance mismatches in the prior art consisting of alternating materials such as asbestos-like gaskets sandwiched between steel washers, the present case involves lo Z, hi Z steps created by differing amounts of essentially the same material, typically metal. This new alternation is amenable to sandwiching masses between concentric thin wall sleeves and thus the lo Z parts are sealable against water or ice and thereby made weatherproof. In contrast, prior-art gasket isolators are subject to being compromised by moisture from weather or other sensed environment, such as steam encountered in steam flowmeters.

Intuitively one might expect that the greater the number or magnitude of Z steps in the square wave, the better the isolator becomes. This turns out to not always be true. In order to optimize the isolator with respect to specific requirements such as minimum weight, minimum length, etc., applicant offers an analysis based on a simple form of the energy transmission equation, $T = 4r/(r+1)(r+1)$ where r is the ratio of impedances of the small and large mass sections. A few numerical examples will help explain the optimization found by the applicant, as set forth in the following table, Table I.

TABLE I

| r | T | INSERTION LOSS, 10 log T, db | IL/r, dB/Section |
|---|---|---|---|
| 1 | 1 | 0 | 0 |
| 2 | .889 | .51 | .255 |
| 3 | .750 | 1.25 | .417 |
| 4 | .640 | 1.94 | .485 |
| 5 | .556 | 2.55 | .510 |
| 5.81 | .501 | 3.00 | .516 |
| 6 | .490 | 3.10 | .517 |
| 7 | .438 | 3.59 | .513 |
| 10 | .331 | 4.81 | .481 |
| 14 | .249 | 6.04 | .431 |
| 20 | .181 | 7.41 | .371 |
| 30 | .125 | 9.04 | .301 |
| 38 | .100 | 10.00 | .263 |
| 50 | .077 | 11.14 | .223 |

Table I shows several interesting points. First, as the impedance peak/valley ratio, r, increases, the insertion loss (IL) increases, but not linearly. This is seen from the fact that values of r=6, 14 and 38 yield IL's of approximately 3, 6 and 10 dB, respectively. Second, to get a "useful" insertion loss of at least 3 dB, one requires a value of r≧5.81. Third, to achieve a particular level of insertion loss it is not immediately apparent whether it is "better" to use a large r or two sections each having half that value of r. For example, r=4 yields more insertion loss that two sections with r=2. Likewise r=6 yields more than two sections of r=3. But r=10 does not yield more than two sections of r=5. This means that if a particular level of IL is required, and if the solution must not exceed a particular weight limit, one cannot simply choose a very large r. It may be necessary to use n sections of an intermediate r value, such that $(n \times IL_o)/(n \times r_o) = IL_o/r_o$ is maximum or near-maximum. The last column of Table I shows that IL/r appears maximized when r is about 6. If other conditions allow it, this choice of r is preferred, because it allows a given IL to be achieved at minimum mass, for IL>3 dB.

It is to be understood that the number of sections may be comprised all in one transducer, shared between two transducers, or shared among transducers and separate "isolator" sections formed in or on a mounting, or about the conduit.

The invention also contemplates the incorporation of isolated transducers directly into equipment other than ducts. For example, the transducers can be installed in valve bodies, preferably upstream from the valve mechanism. The elimination of crosstalk makes it possible for isolated transducers of the present invention to achieve highly accurate measurements in diverse such structures without requiring specially designed flow cells and custom mounting.

Figure 8:
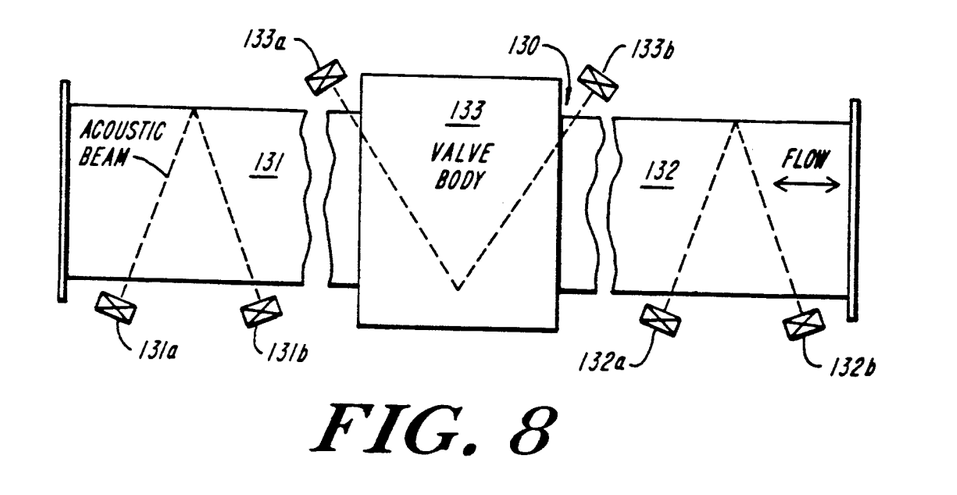
FIG. 8 shows an isolation mounting in a conduit reflected wave system.

FIG. 8 illustrates such a system 130 wherein left and right flow segments 131, 132 lead through a valve body 133, and each segment is provided with a pair of isolated transducers 131a, 131b or 132a, 132b for detecting flow in the segment. In this embodiment, bidirectional flow is contemplated, and instrumentation preferably responds to the direction of flow by selecting the pair of transducers which are upstream of the valve body to conduct flow measurements. In cases where minimum length is absolutely necessary, it may be possible to straddle the valve mechanism with a pair of transducers 133a, 133b. Readings in this case may be possible in only some of the setting positions of the valve mechanism, depending on the extent to which the mechanism interferes with the acoustic beam path between this transducer pair.

Returning now to the constructions of FIGS. 1 and 2 involving a thin diaphragm or window, certain preferred constructions are proposed for reasons of safety to deal with either an occasional or accidental overpressure event in the sensed fluid.

Figure 9:
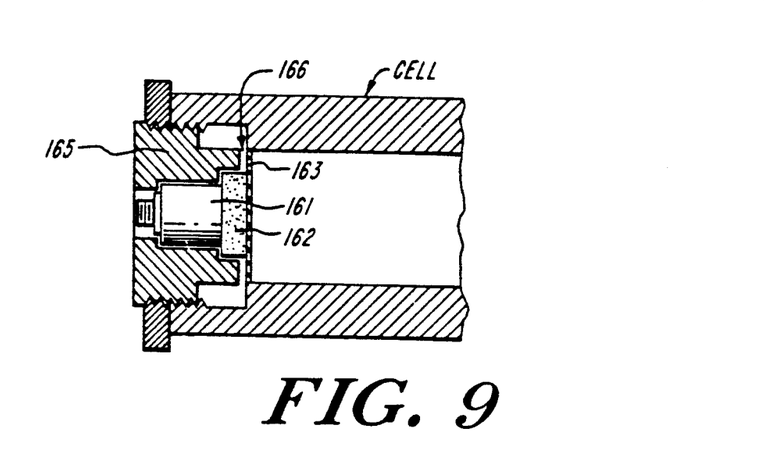
FIGS. 9, 9A show constructions in which tranducer coupling to the fluid or housing varies with changing fluid conditions.

In one variation of the transducer mounting, a support is provided that is slightly spaced, by about one mil, from the diaphragm end window. FIG. 9 shows such an embodiment 160, wherein a transducer crystal 161 attaches, via a λ/4 matching block 162, to a diaphragm 163 which normally is spaced one mil from a supporting body 165 at gap 166. Thus, at low pressure in what we may take as normal operating conditions, the support means does not come into play and so does not introduce acoustic crosstalk. In these conditions the gas pressure is so low as to yield only weak ultrasonic signals, the detection of which would be jeopardized by strong crosstalk. But when pressure becomes high, the support 165 limits the motion of the diaphragm to safe excursions by bearing against the diaphragm. In so doing, crosstalk is increased, but at the same time the signal strength increases due to better match between transducer and gas impedances. Hence the signal to noise ratio can still be high enough to allow useful measurements. The effect of residual crosstalk can be reduced by recording it as a function of pressure and/or temperature, and then subtracting the recorded values from the resultant (signal+noise) detected signal.

Figure 9A:
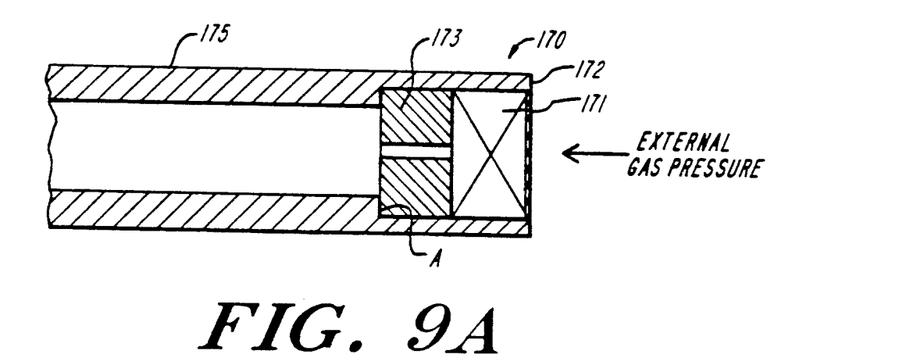

FIG. 9A shows an adaptation of the construction of FIG. 8 to an isolated transducer housing and mount 170. Transducer crystal 172 is coupled to a diaphragm 171 by a couplant, and a pedestal 173 almost spans the cavity between the other side of the crystal 172 and a shoulder of the thin-walled cylindrical isolation section 175 which is for example, similar to that of FIG. 2. As the external gas pressure in the sensing chamber to the right of the crystal rises, pressure builds up at shoulder "A", allowing the crosstalk to increase under the high pressure conditions in which adequate signal strength is achieved. The transducer is thus enabled to operate faithfully over a broad range of pressure conditions.

One embodiment of the foregoing construction is especially applicable to a low impedance gas, for example, in aerospace situations where gaseous hydrogen or other gaseous cryogens are involved. In these cases, one of the collateral problem is coupling the piezoelectric element to the window. Bonding sometimes works, but because of differential expansion coefficients it is advantageous to have some degree of flexibility in the couplant. There seem to be so far no really "flexible" couplants known or available to function at temperatures of liquid nitrogen ($-196°$ C.) and below. Applicant has found, however, that the anti-gall compound sold under the trademark Never-Seez [manufactured by Never-Seez Compound Corp., Broadview, Ill.] can be applied between two surfaces at room temperature, squeezed thin and then it couples ultrasound well at room temperature and also at $-196°$ C. Hence this compound can be introduced as a couplant between the crystal and the end window in the isolated transducer designs shown herein, to operate when the application spans all the way down to cryogenic levels. The Never-Seez material was developed for use at high temperatures, over 1000° C., so this one couplant will operate at both extremes of temperature. A conservative transducer rating would be ±200 or ±250° C. Applicant has identified a second anti-gall compound, sold under the trade name Permatex, Part No. 133K, made by Loctite of Cleveland, Ohio, which is also normally intended for high temperatures, and this too is useful as a cryogenic couplant that can be applied at room temperature. Other suitable cryo couplants may be found among "anti-gall" lubricating compounds.

Another factor addressed by subsidiary aspects of the invention relates more to high temperature gas flows. When transducers made according to this invention are installed in pipes at temperature extremes, the angle that the transducer axis is to make with the pipe depends in part on whether the objective is to have the sound beam's transit time be influenced by flow, or not be so influenced. To be immune to flow, e.g., to measure density or the like, installation would typically be perpendicular to the pipe axis. But if one wants to measure flow by the contrapropagation method (as described for example in applicant's book, Ultrasonic Measurements for Process Control, Academic Press 1989, chap. 4), the usual method is to install transducers at 45 degrees to the flow axis. However, at temperature extremes, if the transducer is recessed in a nozzle, this creates a still region or refraction wedge where the nozzle port enters the freestream, that can significantly divert the propagation path.

To minimize refraction, applicant recognizes that the angle of incidence should be as near zero as practical. On the other hand, too small an angle means that the small upstream - downstream path component results in a time difference that is too small to be measured accurately. Ideally one would like to use normal incidence, thereby avoiding the refracting wedge at temperature extremes, and yet achieve a useful propagation path component $L>$ zero. Applicant has found that at 100 kHz, where commercially available ultrasonic flowmeters such as the Panametrics model GP68 can resolve delta t to 10 ns, a useful minimum delta t is 1 $\mu$s where delta $t=2LV/c^2$. (This sensitivity corresponds to flow resolution of 1%.) In large pipes of diameter $D>300$ mm at high flow velocities, it often turns out that an L of a few centimeters suffices, say $L=3$ cm $=30$ mm. Thus L/D may be on the order of 30 mm/300 mm $=0.1$. Now if the half-angle of the ultrasonic beam in radians measured at the $-3$ dB points exceeds L/D, normal incidence can be used, and the transducers can simply be installed offset by the axial distance L. This simplification is important with respect to safe hot tapping and nozzle attachment, since these installation operations are greatly simplified at normal incidence.

Figure 10:
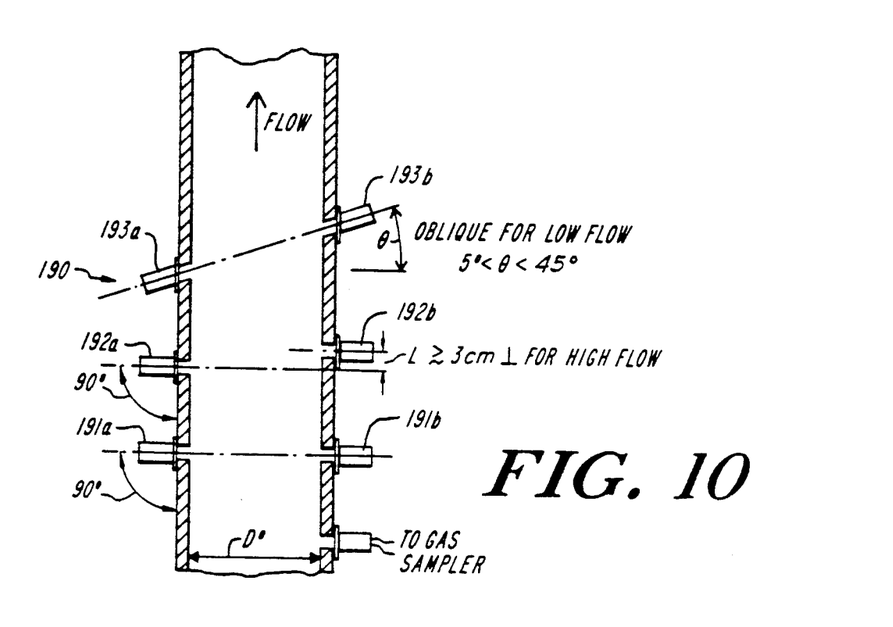
FIG. 10 illustrates slant and offset mounting geometries of transducers in systems according to the present invention.

In cases where both low and high flows can occur, all at high temperature, for example, the invention further contemplates providing multiple sets of ports. As shown in FIG. 10, the ports for high velocity 191a, 191b, 192a, 192b can be at normal incidence, while the ones for low velocity can be oblique because at low velocity the refracting wedge is not so distinct since the freestream temperature tends to penetrate into the port.

When using the flow-cooled transducer of FIG. 3 at low flows, the Bernouli effect may not be sufficient to draw cooling air into the free stream and thereby provide self-cooling and self-purging. In other cases air may be a hazardous or disturbing addition to the composition of the measured gas in the stack. In such cases a positive flow of an acceptable, perhaps inert, gas, e.g., pressurized nitrogen, may be introduced as a preferred purge gas.

In still other cases, as where an electric arc is to be extinguished, sulfur hexafluoride may be the preferred purge gas. In one example of such a case, a minimum mass flow of $SF_6$ must be valved into lower-pressure lines, and it is necessary (in one application in which 362 kV and 800 kV double pressure circuit breakers are employed) to ultrasonically verify within 60 ms that the required flow has occurred, or else a safety circuit triggers other more disruptive protective devices. In this application the flow is both transient and turbulent, and it is difficult to measure the flow velocity accurately in so short a time. Applicant proposes to measure such flow indirectly, by instead ultrasonically measuring the temperature change in the gas based on sound speed (as described in applicant's aforesaid book, chap. 5). Here the temperature is measured over one or more paths to obtain a meaningful average temperature, which, integrated over time, provides a measure of the change in gas mass remaining in the supply reservoir. The transducers for such applications where the conduit is already all welded together in an existing plant, are preferably of the clamp-on type. But when such gas conduit systems are designed with ultrasonic interrogation in mind, one can provide for transducers or conduits with the isolated design of the present invention. This is expected to yield higher accuracy than obtainable with clamp-on transducers.

Figure 11:
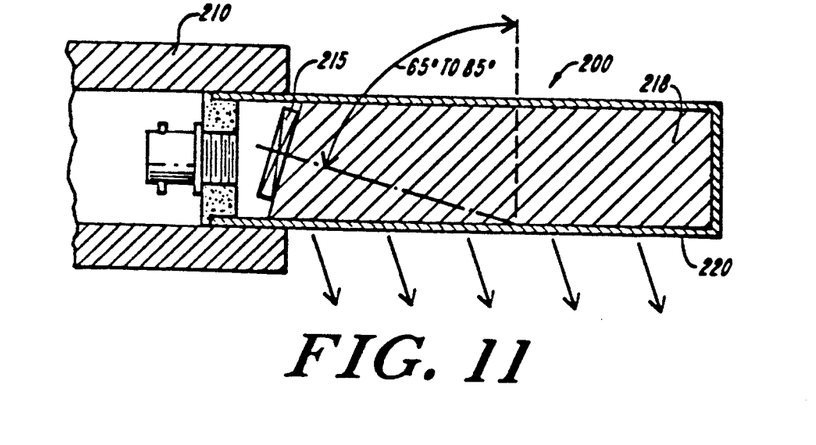
FIG. 11 illustrates a transducer structure for use with low impedance media.

FIG. 11 illustrates another embodiment for an isolation-mounted transducer 200. In this embodiment, an alternating-impedance isolation body 210 is interposed between the transducer crystal 215 and the solid body path of the conduit walls, and the crystal radiates at grazing incidence to excite a thin-walled extended source 220 that radiates or receives the ultrasonic interrogation wave through a surrounding medium. The thin-walled source 220 is thin compared to the wavelength, e.g. preferably under $\lambda/10$ and no more than $\lambda/2$ thick, and is preferably stainless steel containing a wedge 218 made of a low sound-speed material such as CMG or ATJ graphite, or chalcogenide glasses or plastics. The low sound speed contributes to a large refracted angle according to Snell's law. On the other hand if a small refracted angle is sought, then a high sound speed material is preferred, e.g., alumina, beryllia or perhaps berylium.

Figure 12:
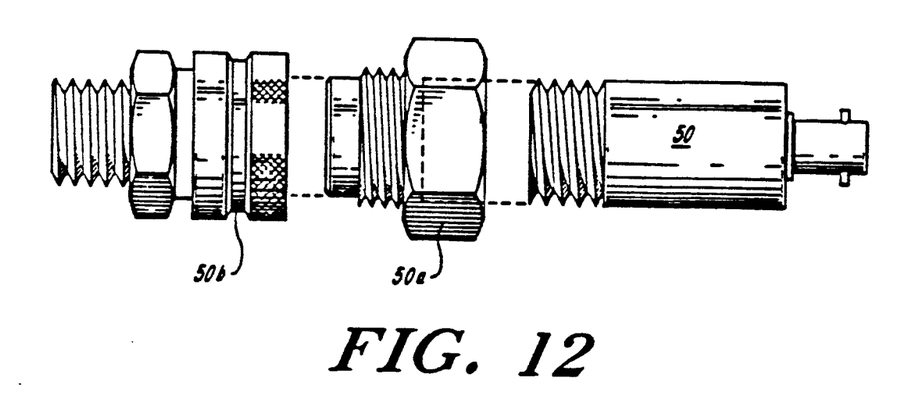
FIG. 12 illustrates a quick-connect embodiment of the invention.

In many of the above-described applications, it is desirable to perform several occasional sets of measurements on a conduit, without any continuing need to monitor fluid parameters, or, as in FIG. 10, one desires to place the transducers at different positions depending on present flow levels. For these applications applicant proposes a conduit-to-transducer mounting as shown in FIG. 12. In this embodiment a isolation-mounted transducer assembly 50 is provided with a quick-disconnect stem fitting 50a, and a corresponding quick-disconnect body 50b is fitted to the conduit or reservoir wall. Suitable interconnecting body and stem parts are, for example, are Swagelok fittings SS-QF-12-B-12-PM and SS-QF-12-S-12-PF. For lower pressure applications, the transducer assembly need not be provided with such secure pressure fittings, and the corresponding mounting may comprise simply a precision bored nozzle and closely fitted cylindrical transducer body which is simply placed in the nozzle bore and positioned or retained by a spring-loaded ball detent. The quick-connect may have an automatic shut-off, or alternatively a plug may be used when the transducer is out.

This completes a description of the principles of the invention, together with illustrative embodiments and several preferred constructions for diverse fluid sensing applications. The invention being thus disclosed, variations and modifications thereof will occur to those skilled in the art, and such variations and modifications are included within the scope of the invention to which an exclusive right is asserted, as defined by the claims appended hereto.

What is claimed is:

1. A system for measuring a characteristic of a fluid by generation of ultrasonic signals with a transducer and propagation of the signals in the fluid, the signals being received and processed after interaction with the fluid to determine said characteristic, wherein ultrasonic signals generated by the transducer are propagated partly as a measurement signal through the fluid, and partly as an interfering signal through material or structures supporting or containing the transducer and the fluid to be measured, and characterized in having a plurality of closely-spaced masses of high acoustic impedance interposed in the path of the interfering signal between a transmitting transducer and a receiving transducer to attenuate crosstalk, said closely spaced masses alternating along the path with regions of low impedance formed of substantially the same material as the masses.

2. The system of claim 1, further comprising quick-connect means for releasably coupling the transducer to a fluid housing without rotation of the transducer.

3. The system of claim 1, further comprising a thin diaphragm coupling the transducer source to the fluid, and a support structure housing the transducer source to normally define a gap between said support structure and at least one of the transducer source or the diaphragm thereby decreasing crosstalk, the support structure and flexibility of the diaphragm cooperating as pressure of the medium increases, to firmly support the diaphragm thus increasing crosstalk under pressure conditions in which transmitted signal strength is also increased whereby extension of the useful operating range of the transducer is achieved.

4. The system of claim 1, wherein the closely spaced masses include a plurality of massive rings spaced along a conduit enclosing a fluid path along which the measurement signal is propagated.

5. The system of claim 1, wherein the closely spaced masses include a plurality of massive rings spaced between a transducer and a conduit mounting opening along a support member extending in a direction opposite to a path followed by the measurement signal.

6. The system of claim 1, wherein the closely spaced masses include at least three massive rings.

7. The system of claim 6, wherein the closely spaced masses include at least five massive rings.

8. A system for measuring a characteristic of a fluid by generation of ultrasonic signals with a transducer and propagation of the signals in the fluid, the signals being received and processed after interaction with the fluid to determine said characteristic, wherein ultrasonic signals generated by the transducer are propagated partly as a measurement signal through the fluid, and partly as an interfering signal through material or structures supporting or containing the transducer and the fluid to be measured, and characterized in having a plurality of closely-spaced masses of high acoustic impedance interposed in the path of the interfering signal between a transmitting transducer and a receiving transducer to attenuate cross-talk, wherein the closely-spaced masses include thick rings which are placed in alternation with thin cylinders.

9. The system of claim 8, wherein the thin cylinders are portions of a cylindrical shell supporting an ultrasonic source away from a conduit or reservoir wall.

10. The system of claim 9, wherein the rings are contiguous and have irregular contacting surfaces that do not allow acoustic energy to propagate therebetween, so that acoustic energy propagates through successive rings only via an adjacent thin cylinder.

11. The system of claim 9, further comprising a sleeve surrounding the cylindrical shell and forming a coolant envelope thereabout for channeling purge fluid about the transducer.

12. The system of claim 8, comprising a transmitting and a receiving transducer mounted at normal incidence in positions axially offset from each other along a conduit.

13. The system of claim 8, wherein the closely spaced masses and thin cylinders have an impedance ratio of at least 3:1.

14. An isolation member for interposition between an ultrasonic transducer and a mounting opening in a container that contains a gas to be measured, such isolation member comprising a thin cylindrical shell constituting a path of low acoustic impedance and adapted to receive the ultrasonic transducer at one end and to mount in the opening at its other end, and a plurality of masses of high acoustic impedance attached to the thin cylindrical shell at successive separated but closely spaced positions along its length whereby said masses, and segments of said cylindrical shell located between successive masses, together constitute a succession of regions of different acoustic impedance along a path between the transducer and the container to attenuate crosstalk propagated along the member.

15. An isolation member according to claim 14, wherein the masses are sealed between inner and outer cylindrical walls.

* * * * *